July 16, 1929.  C. T. SIEBS  1,720,763
VULCANIZER
Filed Nov. 10, 1925    4 Sheets-Sheet 1

Inventor:
Claude T. Siebs
By H. A. Pattison Atty.

July 16, 1929.  C. T. SIEBS  1,720,763

VULCANIZER

Filed Nov. 10, 1925  4 Sheets-Sheet 3

Inventor:
Claude T. Siebs
By Nahanson Atty.

July 16, 1929.  C. T. SIEBS  1,720,763
VULCANIZER
Filed Nov. 10, 1925  4 Sheets-Sheet 4

Inventor:
Claude T. Siebs
By

Patented July 16, 1929.

1,720,763

UNITED STATES PATENT OFFICE.

CLAUDE THEODORE SIEBS, OF RIVERSIDE, ILLINOIS, ASSIGNOR TO WESTERN ELECTRIC COMPANY, INCORPORATED, OF NEW YORK, N. Y., A CORPORATION OF NEW YORK.

VULCANIZER.

Application filed November 10, 1925. Serial No. 68,052.

This invention relates to vulcanizers, and more particularly to apparatus for the vulcanization of insulating material applied over brazed connections in electrical conductors.

The principal object of the present invention is the provision of a simple and inexpensive apparatus for vulcanizing materials, which will automatically control the time of the vulcanizing operation.

In accordance with the main features of the invention, a pair of electrically heated vulcanizing members, cooperating to form vulcanizing surfaces for the article to be cured, are designed to be brought together to engage the article, a time controlling mechanism being rendered effective thereby. The vulcanizer may be preliminarily set to remain effective a definite and desirable length of time and is automatically locked to prevent discontinuance of the vulcanizing operation by the operator until the expiration of such period whereupon the members automatically separate.

The vulcanizer may be used advantageously with a wire brazing device, and for the sake of convenience may be mounted on a common base therewith.

The invention will be readily understood from the following detailed description taken with the accompanying drawings, in which Fig. 1 is a front elevation of a vulcanizer embodying the main features of the invention mounted, with a brazing device, upon a common base which is suitably secured to a movable pedestal;

Fig. 4 is an enlarged vertical sectional view taken on the line 4—4 of Fig. 1 looking in the direction of the arrows;

Figure 1:
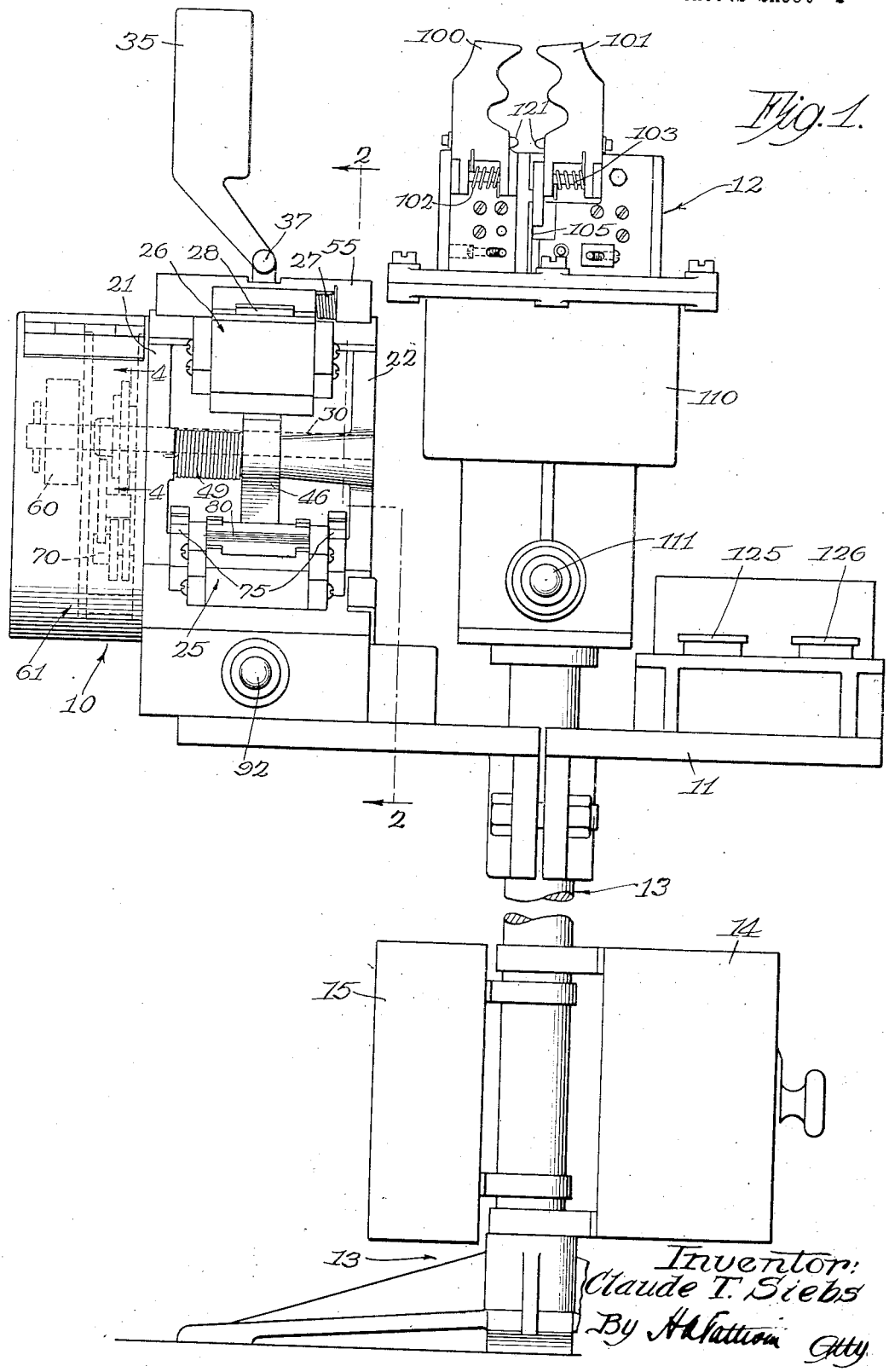

Referring now to the accompanying drawings in which like numerals are employed to designate similar members throughout the several views, the numeral 10 (Fig. 1) refers generally to a vulcanizer embodying the main features of the invention mounted upon a base 11 which is common to a brazing device 12. The base 11 is suitably secured to any supporting member such as a pedestal 13 which may be portable, the upright portion of which supports a rheostat 14 for controlling the electrical current to the brazing device and a transformer 15 adapted to be used in connection with the vulcanizer. The base 11 supports cups 125 and 126 for containing vulcanizing or brazing supplies.

Figure 2:
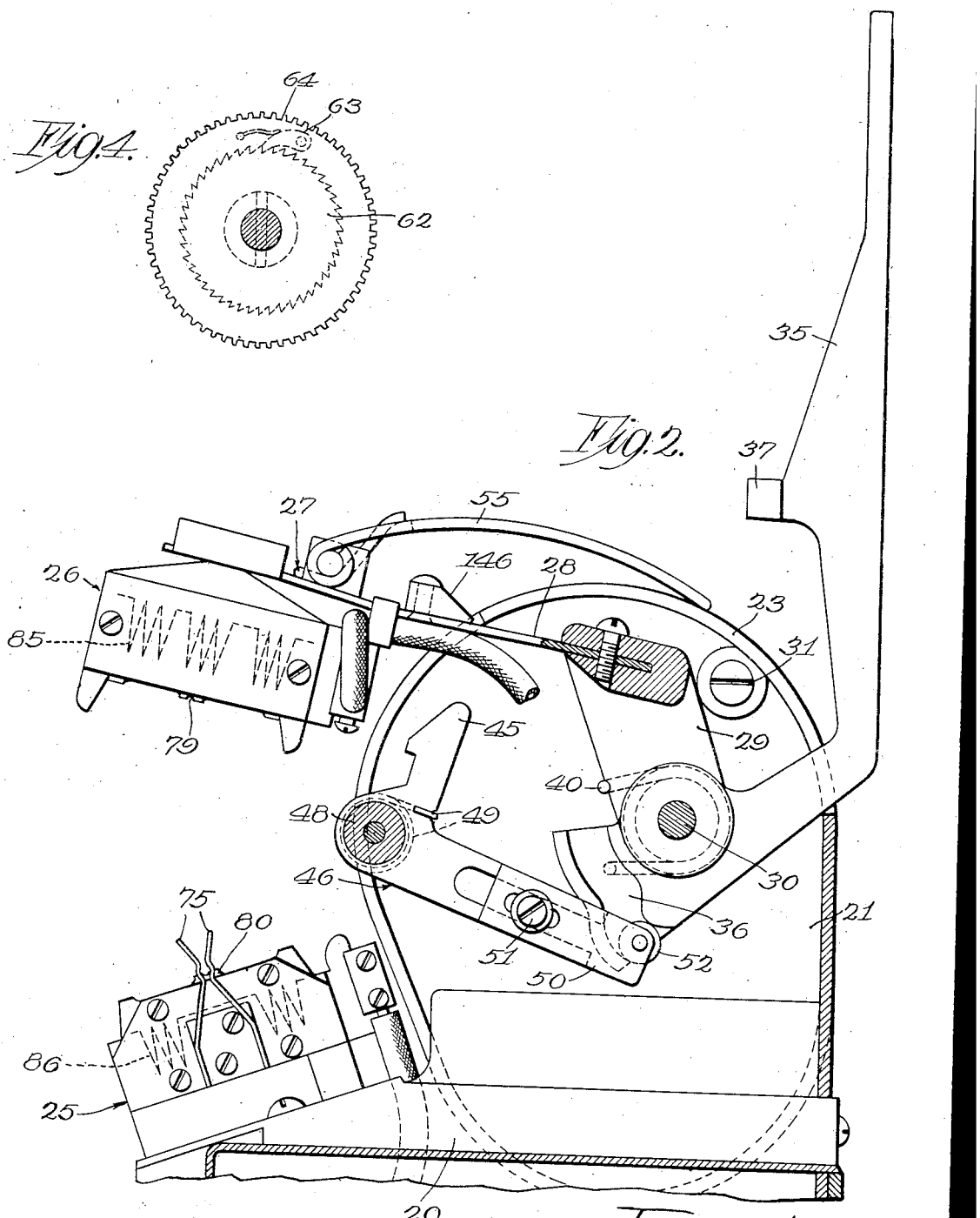
Fig. 2 is an irregular vertical sectional view of the vulcanizer taken on the line 2—2 of Fig. 1 looking in the direction of the arrows and showing the vulcanizing members in an open position.
Figure 3:
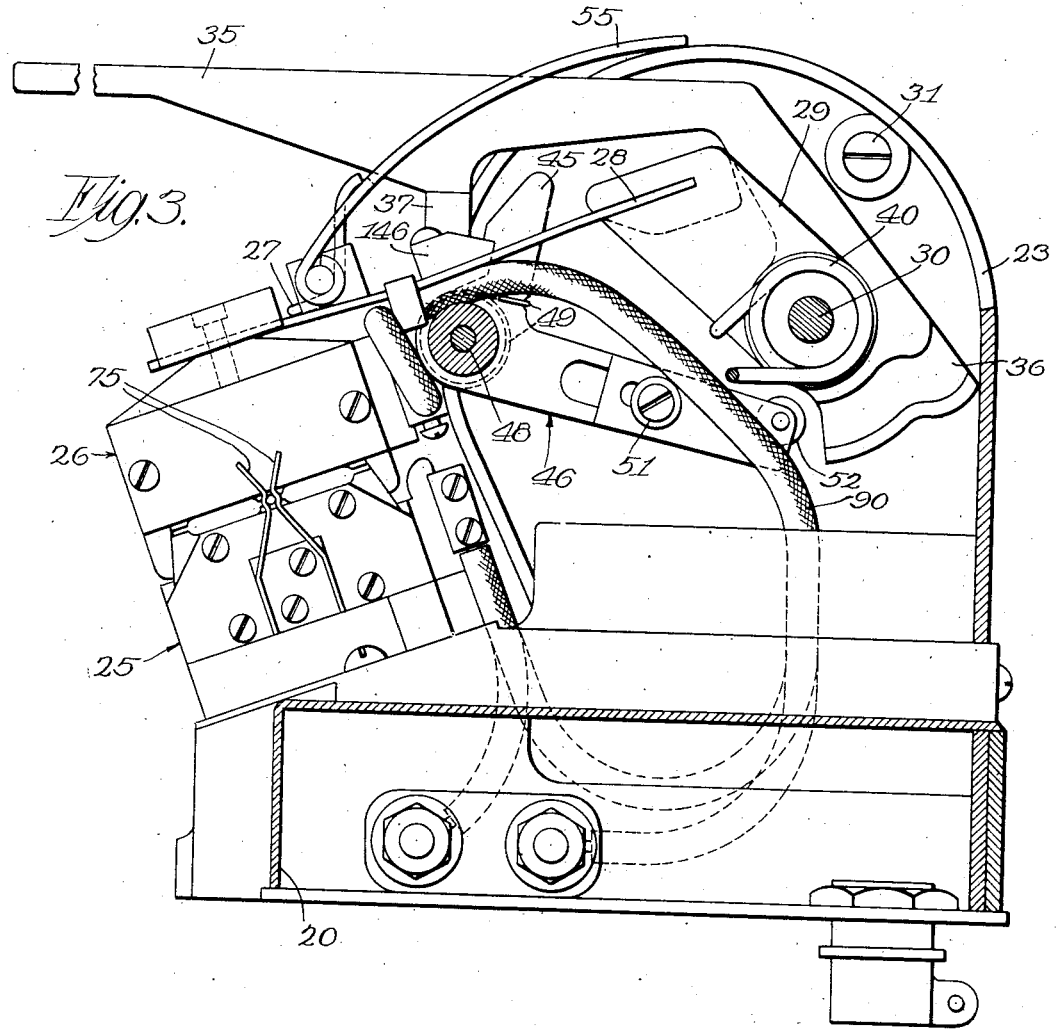
Fig. 3 is a similar view showing the parts in the positions which they assume during the vulcanizing operation.

The vulcanizer, shown more in detail in Figs. 2, 3 and 4, comprises a base 20, upright members 21 and 22 (Fig. 1) and a housing 23, all of the parts of the vulcanizer being supported on these members. A lower vulcanizing member 25 is fastened to the base 20 and an upper vulcanizing member 26 is secured to a pivoted member 27 comprising a section of spring steel 28 and a member 29. The member 29 is bifurcated and the bifurcations thereof are provided with pivot holes through which a shaft 30 secured in the end plates 21 and 22 extends. The member 29 is normally held against a stop pin 31 by a pair of springs indicated at 40, one end of each of the springs being offset and the offset ends secured in holes in the uprights 21 and 22 respectively and the other ends thereof bearing against the member 29. An actuating lever 35 is secured to the shaft 30 between the bifurcations of the member 29 and is provided with a cam groove 36, the function of which will be referred to later, and a lug 37 which is adapted to engage the member 28 when the lever is actuated, thus pivoting the member 27 around the shaft 30, against the springs 40, to associate the two vulcanizing members. Simultaneously a latch 45 on a bell crank lever 46 rotatable on a shaft 48, engages a latch seat 146 on the pivoted member 27 and the member 28 being depressed and tensioned by the lug 37, this latching action maintains a continuous pressure of the member 26 against the member 25 when the two members are associated. The shaft 48 is provided with two lugs upon the upright members 21 and 22, and as shown particularly in Fig. 1, a spring 49 is mounted on one of the lugs and tends to rotate the bell crank in a counter-clockwise direction, thus tending to keep the latch in engagement with the latch seat 146. The long arm of the bell crank is forked to receive an unlatching member 50 which is secured in any desired position longitudinally thereof, by a set screw 51, and is provided with a roller 52 which is adapted to ride in the cam groove 36. A cover 55 having one end secured to the pivoted member 27 and the other end slidably engaging the exterior of the housing 23 prevents foreign matter from entering the mechanism.

The cam groove 36 is equidistant throughout the major portion of its curve, from the center of the shaft 30 which is the axis about which it turns. This feature prevents movement of the bell crank 46 by holding the roller 52 stationary and thereby preventing release of the latch while this portion of the cam groove is in contact with the roller. The end portion of the cam, however, is eccentrically curved and is designed to lower the position of the roller 52 to rotate the bell crank and release the latch.

The vulcanizing time is automatically controlled by an interrupting mechanism which will now be described. The lowering of the lever 35 rotates the shaft 30 to which this lever is secured, and tensions a clock spring 60 which is associated with a suitable clock mechanism indicated generally by the numeral 61 (Fig. 1). Any ordinary mechanism is utilized to permit tensioning of the spring 60 without affecting the clock mechanism 61, such as the arrangement shown in Fig. 4, in which a ratchet wheel 62 is pinned to the shaft 30 and a ratchet 63, engaging the periphery of the ratchet wheel, is carried on a gear 64 which is loose on the shaft. A lowering of the lever 35, tensioning the main spring 60, turns the ratchet wheel 62 in a counterclockwise direction, permitting the ratchet pawl to ride over the teeth in the ratchet wheel until the arm is completely lowered. As soon as the arm is released, however, the tension in the clock spring tends to rotate the shaft 30 with the ratchet gear 62 in a clockwise direction carrying the gear 64 which is one of the gears of the clock mechanism, with it. Any suitable escapement mechanism indicated schematically (Fig. 1) and designated by the numeral 70 and which is provided as a part of the clock mechanism limits the speed of unwinding of the spring 60. As the spring is unwound, however, the resulting rotation of the shaft 30 carries the lever 35 with it advancing the cam groove 36 of the lever so that the roller 52 rides into the eccentric portion of the cam. This causes a movement of the bell crank 46 to disengage the latch 45, thereby allowing the vulcanizing members 25 and 26 to be dissociated from each other in the manner described. The vulcanizing time may be regulated by adjusting the clock mechanism or by releasing the set screw 51 and adjusting the position of the latching member 50. This will vary the time at which the eccentric portion of the cam 36 will come into engagement with the roller 52 with any given speed of the clock mechanism. The time controlling portion of the vulcanizer including the clock mechanism and the unlatching member 50 are preferably placed in the vulcanizing unit in such a way as to be inaccessible to the operator.

Figure 5:
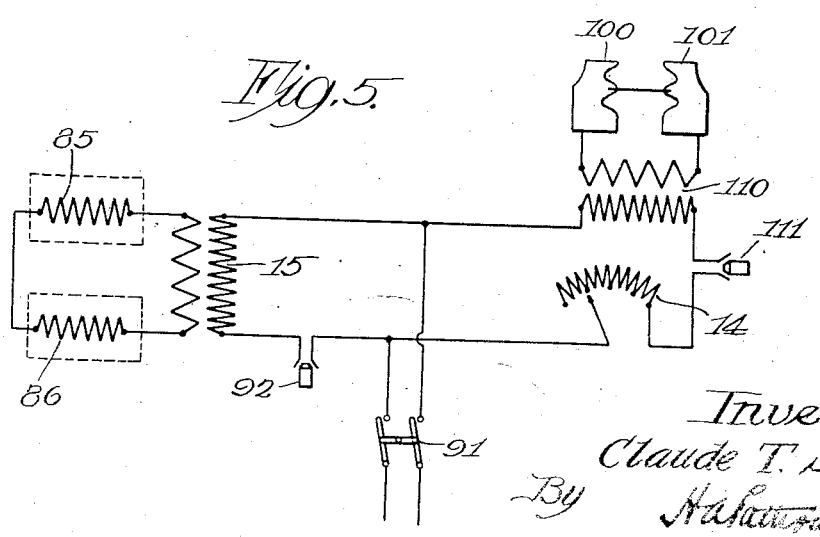
Fig. 5 is a diagram of an electrical circuit for operating the vulcanizer and the associated brazing device.

When rubber insulation on electrical conductors is vulcanized, suitable means associated with the lower vulcanizing member, such as clamps 75, 75, are provided to center the wire. When the vulcanizer is used for the purpose just mentioned the contacting surfaces of the vulcanizing members are suitably shaped as at 79 and 80 to conform to the contour of the wire covering. Pressure is maintained on the rubber compound when held between these surfaces, as described in a preceding paragraph, by the action of the spring 28, to which the member 26 is secured. The vulcanizing members 25 and 26 contain electrical heating elements, of any suitable type, to maintain the vulcanizing surfaces at the temperature desired. These heating elements indicated in Figs. 2 and 3 by the numerals 85 and 86, are supplied with current through suitable conductors, portions thereof being indicated in the figures by the numeral 90. Fig. 5 shows the wiring diagram, current being supplied from a suitable source (not shown), through a line switch 91 which connects the vulcanizing and brazing portions of the circuit (shown in the same figure) with the line. A suitable switch such as a push button switch 92 mounted on the base member 20 (Fig. 1) controls the admission of current to the transformer 15, the secondary winding of the transformer being connected in series with the upper and lower heating elements 85 and 86, respectively.

Figure 6:
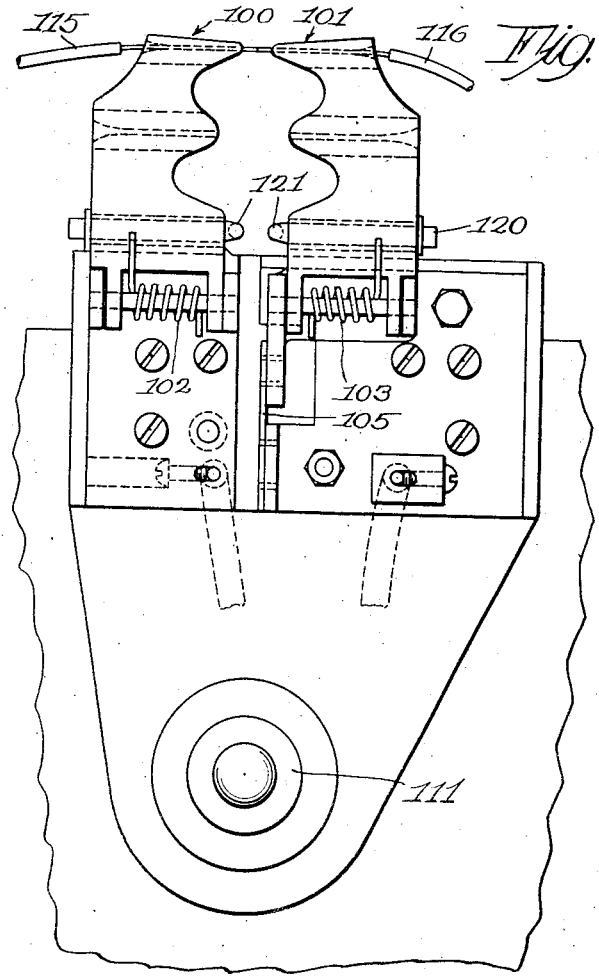
Fig. 6 is a fragmentary front elevation of the brazing device shown in Fig. 1.
Figure 8:
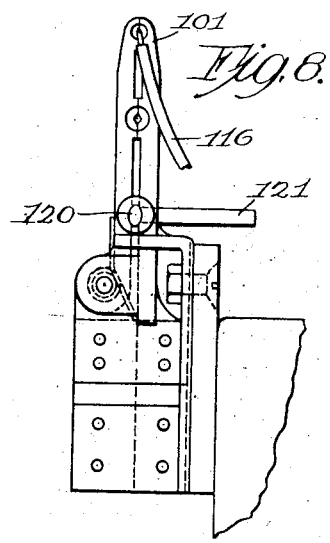
Fig. 8 is a fragmentary end elevation thereof.
Figure 7:
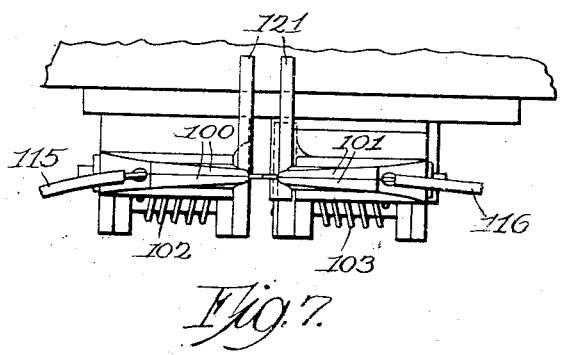
Fig. 7 is a plan view thereof.
Figure 9:
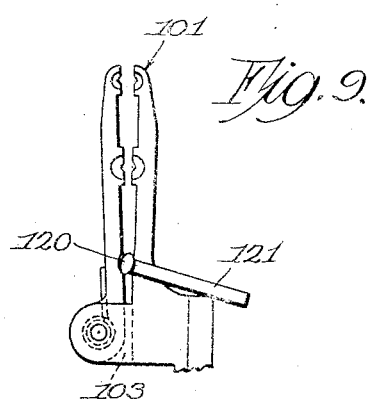
Fig. 9 is an end elevation of one of the clamping devices showing the jaw members in an open position.

The vulcanizer is of particular utility when used in connection with the brazing device shown mounted upon the common base 11 (Fig. 1). This device comprises two pairs of oppositely disposed brazing jaws 100 and 101, the two jaws in each assembly being held normally in an associated position by springs 102 and 103, respectively. The pair of jaws 101 are mounted upon a leaf spring 105, and the jaws 100 are mounted upon a non-resilient support, the pairs of jaws being connected to opposite ends of the secondary winding of a transformer indicated at 110 (Fig. 5), the admission of the current to the transformer being controlled by a push button switch 111. Wires 115 and 116 (Figs. 6 and 7) which are to be brazed or welded are placed in the oppositely disposed jaws, these jaws being separated, for the purpose of inserting wires, by any suitable device (Figs. 8 and 9), such as an eccentric 120 which is integral and adapted to be rotated by a lever 121, thus forcing them apart against the action of the spring 102 or 103, as the case may be. In using the brazer or welder, the wires are placed in position as shown in Fig. 6 with their ends abutting and the jaws 101 forced slightly back by the abutting wires to place a slight tension on the leaf spring 105. Current is then admitted to the primary of the transformer, and the two wires closing the secondary winding of the transformer, are supplied with current which heats them sufficiently on account of their relatively high resistance, so that they are welded or brazed together. The brazing jaws 100 and 101 are preferably supplied with a plurality of jaw openings, as shown, to accommodate different sizes of wire. Each opening being so designed that it will accommodate several sizes of wire, a great range of sizes is adaptable for use therewith. Different current strength is desirable when brazing different sizes of wires and this current may be regulated by the previously mentioned rheostat 14 (Fig. 1).

When the vulcanizer is used in connection with a brazing device of this kind, the metal portion of the conductor is joined by brazing or welding as desired, and the rubber compound insulation is joined by a vulcanizer embodying the features of the present invention. In using the vulcanizer the brazed wire is covered with a vulcanizable compound and placed in the clamps 75, 75 so that the conductor is in contact with the contoured surface 80. Current having been supplied to the heating elements 85 and 86 for a sufficient length of time to bring the members 25 and 26 to the desired temperature, the lever 35 is lowered until the latch 45 engages the latch seat 146. The lever is then released and slowly travels to its upward position, actuated by the clock spring 60 but timed by the clock mechanism 61. When the eccentric portion of the cam 38 engages the roller 52 the latch 45 is released and the member 26 raised by the springs 40. The conductor with the vulcanized sheath over the brazed joint therein is then removed from the clamps 75 at the convenience of the operator.

The temperature of the vulcanizing surfaces is automatically controlled by the transformer 15 and heating elements 85 and 86, these portions of the apparatus being beyond the control of the operator. During the continued use of the vulcanizer current is supplied all of the time and is therefore constant, and when insulation on electrical conductors is vulcanized so little heat is conducted away from the vulcanizing surfaces that they suffer no appreciable loss of heat.

What is claimed is:

1. In a mechanism for vulcanizing material, a pair of vulcanizing members each having a groove corresponding to the shape of the material, means for heating the members, spring clips for securing the material in the groove of one of the members, means for bringing the members into association to engage the material, and means for automatically controlling the time of association of the members.

2. In a mechanism for vulcanizing material, a vulcanizing member for receiving the material to be vulcanized, means for heating the member, a pressure member for holding the material associated with the vulcanizing member, a lever connected therewith for moving the pressure member into engagement with the material, a latch member rendered effective by such movement to maintain the engagement, a roller carried by the latch member, and means carried by the lever including a cam surface continuously engaging the roller to control the release of the latch.

3. In a mechanism for vulcanizing material, a vulcanizing member for receiving the material to be vulcanized, means for heating the member, a pressure member for holding the material associated with the vulcanizing member, a lever connected therewith for moving the pressure member into engagement with the material, a latch member rendered effective by such movement to maintain the engagement, means also rendered effective thereby to return the lever to normal, a roller carried by the latch member, and means carried by the lever including a cam surface continuously engaging the roller to control the release of the latch when the lever approaches the normal position thereof.

4. In a mechanism for vulcanizing material, a vulcanizing member for receiving the material to be vulcanized, means for heating the member, a pressure member for holding the material associated with the vulcanizing member, a lever connected therewith for moving the pressure member into engagement with the material, a latch member rendered effective by such movement to maintain the engagement, means also rendered effective thereby to return the lever to normal, a roller carried by the latch member, means carried by the lever including a cam surface continuously engaging the roller to control the release of the latch when the lever approaches the normal position thereof, and means for adjusting the position of the roller to vary the length of the period elapsing before the release of the latch.

5. In a mechanism for vulcanizing material, a pair of vulcanizing members, means for heating the members, means for bringing the members into association with each other to engage the material, a latch holding the members in association, means rendered effective due to the movement of the second mentioned means in a reverse direction for operating the latch, and means for adjusting the effective position of the latch to vary the period elapsing before the release of the latch.

In witness whereof, I hereunto subscribe my name this 28th day of October A. D., 1925.

CLAUDE THEODORE SIEBS.